:::

United States Patent [19]

Ive

[11] Patent Number: 5,916,089
[45] Date of Patent: Jun. 29, 1999

[54] SUPPORT ARTICLE FOR USE WITH INFANT CARRIER DEVICE

[76] Inventor: Diana R. Ive, 12838 W. Elsworth Pl., Lakewood, Colo. 80228

[21] Appl. No.: 08/796,234

[22] Filed: Feb. 6, 1997

[51] Int. Cl.⁶ .............................. A47D 15/00; A47G 9/00
[52] U.S. Cl. ................ 5/655; 5/632; 5/922; 297/219.12; 297/467
[58] Field of Search ................................ 5/655, 632, 636, 5/637, 630, 648, 922; 297/467, 219.12, 397

[56] References Cited

U.S. PATENT DOCUMENTS

| | | | |
|---|---|---|---|
| D. 328,683 | 8/1992 | Kalozdi | 5/655 |
| 1,967,067 | 7/1934 | Rightmire | 5/636 |
| 2,644,173 | 7/1953 | James . | |
| 3,165,355 | 1/1965 | Hitchcock, Jr. et al. | 297/216 |
| 3,366,294 | 1/1968 | Stephenson . | |
| 3,389,411 | 6/1968 | Emery . | |
| 3,992,057 | 11/1976 | Studebaker | 297/467 |
| 4,173,048 | 11/1979 | Varaney | 5/632 |
| 4,343,513 | 8/1982 | Welch | 5/655 |
| 4,383,713 | 5/1983 | Roston | 297/219 |
| 4,695,092 | 9/1987 | Hittie | 297/219.12 |
| 4,779,930 | 10/1988 | Rosen | 297/397 |
| 5,056,533 | 10/1991 | Solano | 5/655 |
| 5,137,334 | 8/1992 | Cheney et al. | 297/467 |
| 5,310,245 | 5/1994 | Lyszczasz | 5/655 |
| 5,383,711 | 1/1995 | Houghteling | 5/636 |
| 5,551,107 | 9/1996 | Graebe | 5/653 |
| 5,586,351 | 12/1996 | Ive | 5/655 |
| 5,599,063 | 2/1997 | Lister et al. | 297/325 |

*Primary Examiner*—Alex Grosz

[57] ABSTRACT

A support article for use with a carrier device provides adjustable cushioned support to an infant placed therein in a travel position and comprises an elongated pad adapted to be interposed between the infant and the carrier device and a raised cushion assembly. The elongated pad has a first surface upon which the infant can be placed, an opposite second surface and a pair of longitudinally extending side edges. The raised cushion assembly is disposed on the first surface and includes a pair of transversely spaced apart cushion elements that are adjustable in position relative to one another. At least a first one of these cushion elements is positioned adjacent to a longitudinally extending side edge and is configurable into a folded state wherein a free edge portion thereof is releasably connected to the first surface thereby to define a channel between the cushion elements which is sized to accommodate a torso region of the infant so that the cushion assembly is operative to provide lateral stability to the torso region during transport in the carrier device. The support article may also include a crotch cushion disposed on a lower region of the first surface which helps to maintain the infant in a proper travel position and to buffer the infant against impact during transport in a car seat. This crotch cushion may be in the form of an elongated pad that is bent around a mid-section thereof to form a pair of spaced apart legs.

21 Claims, 5 Drawing Sheets

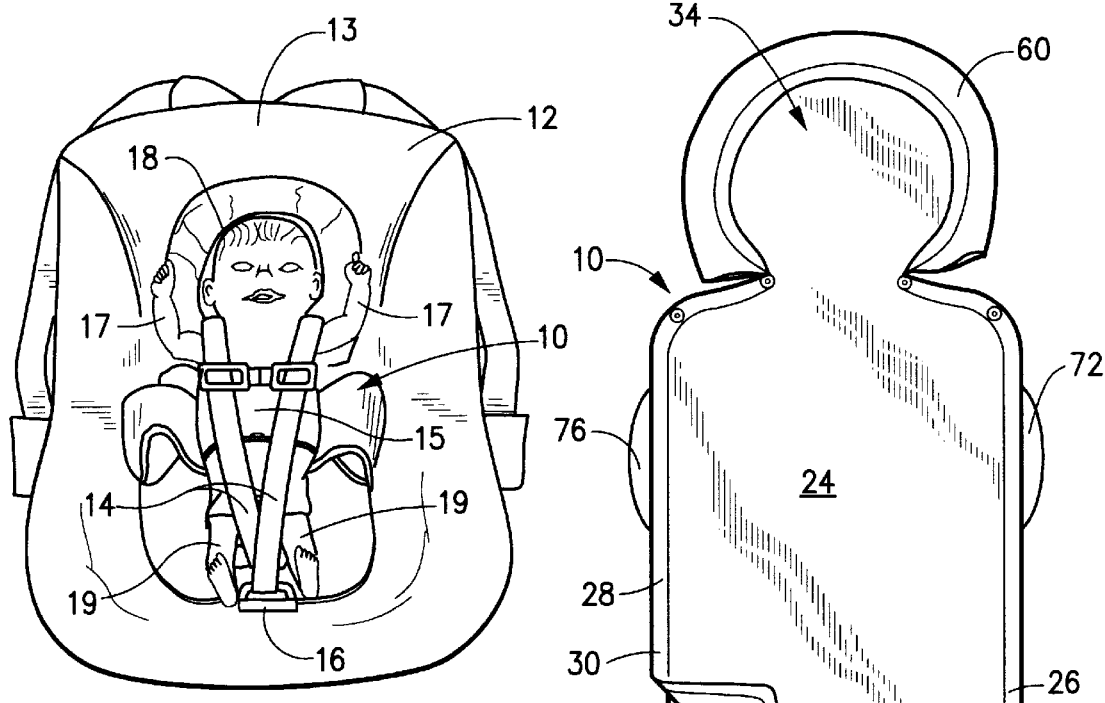
Fig.1
Fig.4
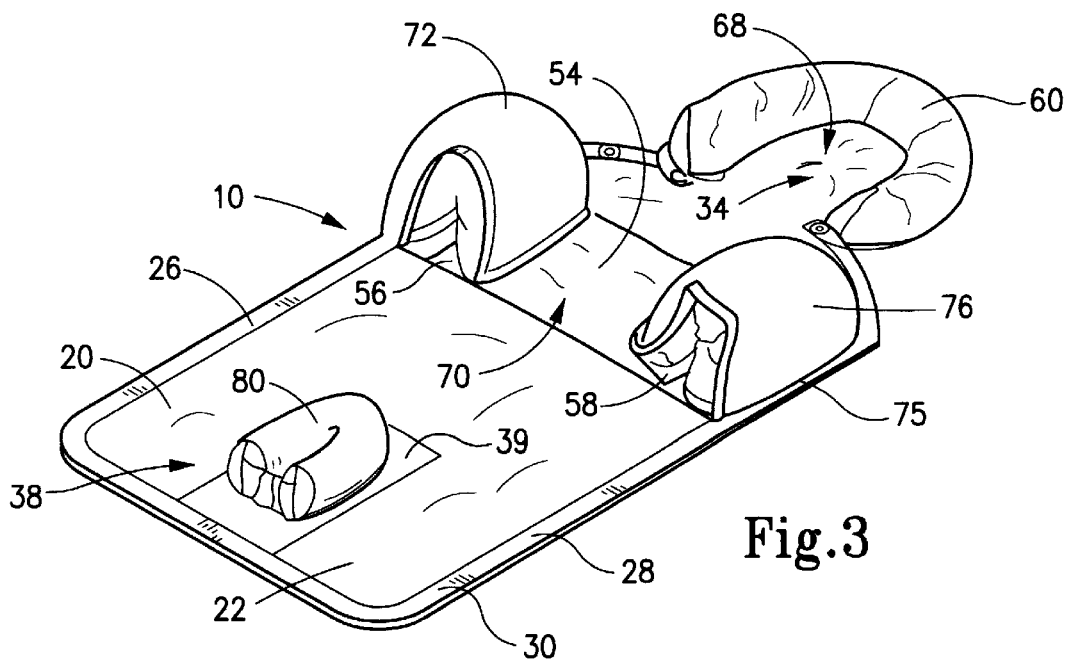
Fig.3

SUPPORT ARTICLE FOR USE WITH INFANT CARRIER DEVICE

FIELD OF THE INVENTION

The present invention broadly relates to support articles for infants. More particularly, the present invention concerns support articles which are adapted for use with infant carriers, such as car seats, strollers, swings and the like, to provide cushioned support to an infant placed therein. The present invention is further directed to such support articles which provide adjustable cushioned support for undersized infants, such as premature babies and low birth weight babies, during transport in these types of carrier devices.

BACKGROUND OF THE INVENTION

Most parents would undoubtedly agree that caring for an infant is quite a formidable task. Caretaking requires the devotion of much time, energy and attention to an infant's needs, especially during the early stages of development. Undersized infants, such as premature babies and low birth weight babies, are particularly in need of a parent's constant devotion because their bodies are less developed than normal. One of the major concerns for caretakers of undersized infants is to provide a comfortable environment during routine excursions. Of equal if not greater importance is that the infant's accommodations need to be sufficiently safe so that the child is less susceptible to injury during transport.

A concerted effort is made so that the various infant carrier devices on the market today, such as car seats, strollers and booster seats, provide both comfort and adequate safety. Where car seats are concerned, companies have developed products in conformity with safety guidelines established by the American Academy of Pediatrics (AAP). For example, these guidelines recommend that the shoulder harness, or safety straps, associated with the car seat have a slot height of less than or equal to ten inches (10") and that the distance between the crotch strap and the seat's backrest be less than five and one-half inches (5½") to prevent the infant from slouching too much during travel. It is also suggested that the seat be inclined rearwardly at approximately a 45° tilt and that thick foam padding not be employed behind the baby's back to reduce compression against the seat's backrest in the event of an accident. Of course, for preemies and other undersized infants it is further recommended that the car seat be situated so that the baby is facing the rear of the vehicle.

Despite the guidelines established by the AAP, a problem with conventional carrier devices is that they sometimes do not provide adequate cushioned support for preemies and low birth weight babies whose muscles have not yet developed to the stage where the baby can react to sudden movements. Undersized infants are particularly susceptible to this because the neck muscles have not developed to the point where they can support the infant's head to maintain it in an upright position. Further, the infant's torso is under-developed so there is a need to provide lateral stability to the torso during travel while not obstructing the child's capability to breathe.

In an effort to address the need of providing additional support for an infant's head, neck and shoulders, U.S. Pat. No. 5,586,351 to Ronald A. Ive, issued Dec. 24, 1996, provides an infant support article in the form of an elongated pad which includes a raised support pillow adapted to engage the infant's head and neck region in order to provide lateral stability thereto. The raised support pillow may be adjustable on the pad to accommodate either various sizes of infants or the same infant as he/she grows.

Also aimed at meeting this need is U.S. Pat. No. 4,383,713 to Roston, issued May 17, 1983, which describes an orthopedic support apparatus for infants. Roston's orthopedic support apparatus comprises a planar sheet fabricated from a relatively high pile material. A pillow member is disposed on the planar sheet which diverges upwardly therefrom to form a region for accommodating the head and neck of a child. Also included are left and right lateral support members which are positionable at the sides of the infant when the infant's head is placed on the pillow. These lateral support members are selectively positionable on the planar sheet of the orthopedic support.

Despite the advantages of the infant support devices presently available, a need still exists to provide an improved support article for use with carrier devices, and particularly car seats, that has sufficient cushioned support for an infant placed therein. It would also be advantageous to provide such a support article which is capable of providing a cushioned support for the head and torso regions of the infant and which operates as a buffer against impact from the car seat's safety harness. There is a further need for such a support article to be adjustable in order to accommodate various sizes of babies. The present invention is particularly concerned with addressing these needs and advantages, among others.

SUMMARY OF THE INVENTION

It is an object of the present invention to provide a new and useful support article which provides a cushioned support to an infant placed in a carrier device, such as a car seat, a stroller, a booster seat and the like.

Another object of the present invention is to provide such a support article which is adjustable to accommodate various sizes of infants, particularly undersized babies.

A further object of the present invention is to provide a new and useful support article for use with a carrier device which laterally stabilizes a torso region of an infant during transport.

Yet another object of the present invention is to provide such a support article which is operative to buffer the infant against impact with the carrier device's safety buckle during transport.

Still a further object of the present invention is to provide a support article for an infant which is adjustable to provide a comfortable, yet protective support as the infant grows.

In furtherance of these objectives, the present invention relates to a support article that is adapted for use with a carrier device to provide adjustable cushioned support to an infant that is placed thereon in a travel position. Broadly, a support article of the present invention comprises an elongated pad and an adjustable cushion assembly. The elongated pad is adapted to be interposed between the infant and the carrier device and includes opposite first and second surfaces and a pair of longitudinally extending side edges. The adjustable cushion assembly is disposed on the first surface and is operative to provide lateral stability to a torso region of the infant during transport in the carrier device. The raised cushion assembly broadly includes a pair of transversely spaced apart cushion elements that are adjustable relative to one another. At least a first one of the cushion elements has a proximal edge portion positioned adjacent to an associated one of the longitudinally extending side edges and is configurable into a folded state wherein a free edge portion thereof is releasably connected to the first surface to define a channel between the cushion elements which is sized to accommodate the torso region of the infant. As such, the width of this channel may be selectively varied. Preferably, an identical second cushion element is also provided and has its proximal edge portion positioned adjacent to another of the longitudinally extending side edges and extends from this proximal edge portion to terminate at a free edge portion that is adapted to releasably engage the first surface.

The proximal edge portions of each of the first and second cushion elements may be affixed to the elongated pad along their associated one of the longitudinally extending side edges. Stitching along a seam line may be employed for this purpose.

A pair of cooperative fasteners may be employed to releasably connect the distal edge portion of each of the cushion elements to the elongated pad's first surface when the cushion elements are configured into their folded states. A first one of a cooperative fasteners in each pair is preferably affixed to the distal edge portion of its associated cushion element and formed as a strip of hook material, and a second one of the cooperative fasteners in each pair is preferably affixed to the first surface and formed as a strip of loop material. To this end, the elongated pad may include a single band of loop material fixed thereto which extends between the longitudinally extending side edges to define the second one of the cooperative fasteners in each of the first and second pairs.

The support article may also include a raised support pillow connected to the elongated pad and extending in an arcuate configuration around an area that is sized and adapted to receive the infant's head when the infant is placed in the travel position on the carrier device. This raised support pillow is operative to stabilize the infant's head by resisting lateral movement of the head during transport in the carrier device. The raised support pillow may also be adjustably connected to the elongated pad whereby the size of the area is selectively changeable.

The present invention also relates to a support article that is specifically adapted for use with a carrier device in the form of a car seat to provide a cushioned support for an infant seated thereon. The car seat includes a backrest provided with a pair of shoulder straps that are operative to extend downwardly over the infant to releasably engage a safety buckle. The support article comprises an elongated pad, a cushion assembly and a raised support pillow as discussed above. Here, the raised support pillow is disposed on an upper region of the elongated pad's first surface and the cushion assembly is disposed on a medial region of the pad's first surface. The support article also includes a crotch cushion disposed on a lower region of the first surface and centrally located in this region so that when the infant is placed in the seated position on the elongated pad, the infant's legs can straddle a portion of the crotch cushion. The crotch cushion is operative both to maintain the infant in a proper travel position and to buffer the infant against impact with the safety buckle during transport.

Preferably, the crotch cushion is adapted to releasably engage the first surface and is selectively connectable thereto at a plurality of discrete locations longitudinally therealong. A pair of cooperative fasteners may be located, respectively, on the crotch cushion and the lower region of the first surface for this purpose, with a first one of the cooperative fasteners affixed to the crotch cushion and formed as a strip of first material and a second one of the cooperative fasteners affixed to the first surface and formed as a strip of second material. The crotch cushion may assume a variety of configurations.

Finally, the present invention also contemplates an improvement to a support article which is adapted for use with a carrier device that includes an elevated backrest provided with a pair of shoulder straps adapted to extend downwardly over an infant to releaseably engage a lower safety buckle. Here, the support article includes an elongated pad having a first surface upon which the infant may be placed in a seated position, a raised support pillow disposed on an upper region of the first surface and extending around an area that is sized and adapted to receive the infant's head, and a pair of raised cushions that are disposed on a medial region of the first surface and spaced-apart from one another a separation distance to define a channel within which the infant's torso may be positioned.

Here, the improvement comprises a crotch cushion releasably attachable to a lower region of the first surface and centrally located in this lower region so that when the infant is placed in the seated position on the elongated pad, the infant's legs can straddle a portion of the crotch cushion.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 1 is a front view in elevation of an infant placed in a carrier device utilizing a support article according to any one of the various exemplary embodiments of the present invention;

FIG. 3 is a perspective view of the support article according to the first exemplary embodiment of the present invention with the cushion assembly thereof configured into a folded state;

FIG. 4 is a bottom plan view of the support article according to the first exemplary embodiment of the present invention partially revealing the pad's internal foam layer;

DETAILED DESCRIPTION OF THE EXEMPLARY EMBODIMENTS

Figure 2:
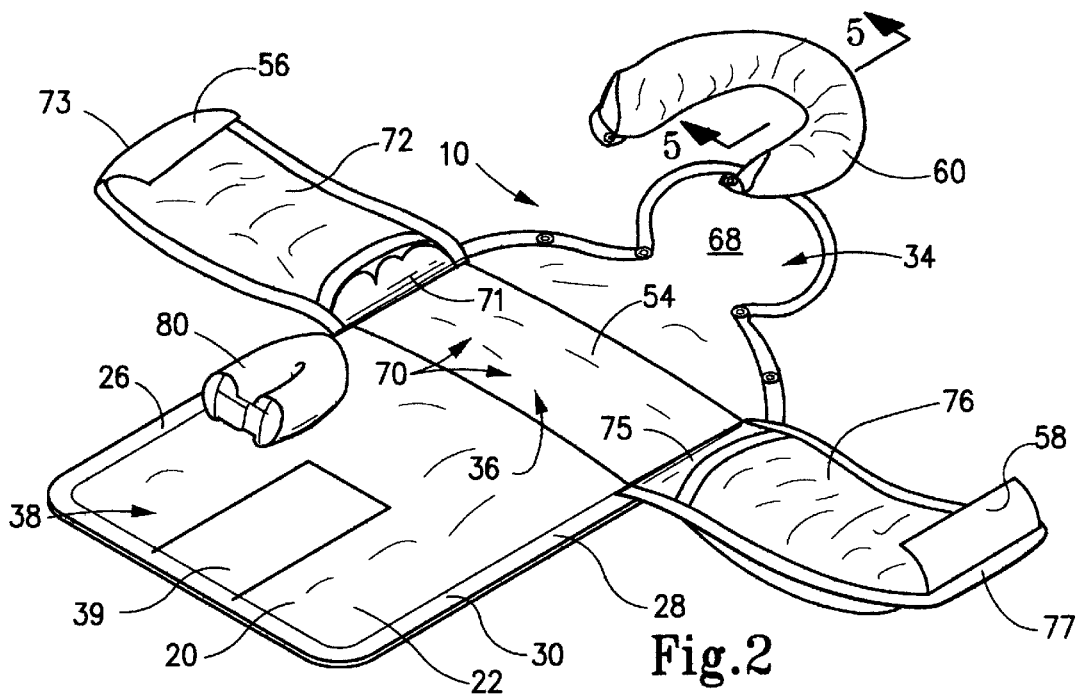
FIG. 2 is an exploded perspective view of the support article according to a first exemplary embodiment of the present invention.

The support article of the present invention is adapted for use with a carrier device to provide an adjustable cushioned support to an infant placed therein. While the ensuing description of the present invention is explained in reference to a support article used in conjunction with an upright car seat, one of ordinary skill in the art would appreciate that the support article may also be employed with a variety of other types of carrier devices, such as strollers, booster seats and flat, bed-like car seats, to name only a few. Therefore, while the support article is described with reference to an infant situated in a seated position, it should be understood that the support article is equally well suited for situations in which the infant is fully reclined against a support.

The support article 10 is generally introduced in FIG. 1 where it is shown to be interposed between an infant 18 and a carrier device in the form of a conventional car seat 12. As will be appreciated from the description to follow, the support article is operative to provide adjustable cushioned support to infant 18 during transportation in a travel position. In order to securely retain infant 18 in the travel position of FIG. 1, carrier device 12 includes a harness in the form of safety straps 14 which extend from the carrier's elevated backrest 13 over infant 18 to releasably engage a lower safety buckle 16.

Typically, these shoulder straps 14 have a slot height of approximately ten inches (10") from the base of the backrest 13. Because car seats are designed to accommodate various sizes of infants, it is not uncommon for these types of carrier devices to have the safety buckle 16 positioned between five and nine inches from backrest 13. With such a wide range of buckle locations, then, it is important to ensure that infant 18 is comfortably, yet securely retained within carrier device 12 during transport to avoid any unnecessary injury. This is particularly true for undersized infants, such as premature babies and low birth weight babies, which have a hospital release weight in a range of approximately 3½ to 8 lbs.

With this in mind, one exemplary construction for support article 10 may best be appreciated with reference to FIGS. 2–4. Support article 10 broadly includes an elongated pad 20, a raised support pillow 60, an adjustable cushion assembly 70 and a crotch cushion 80. Elongated pad 20 has opposite first and second surfaces 22, 24 which are secured together along a peripheral margin 30 to enclose an internal foam layer 23 as shown in FIG. 4. First surface 22 and second surface 24 may each be formed from a fabric material, such as polycotton. Layer 23 may be formed from a relatively thin layer of flame retardant polyurethane foam having a low compression factor and a thickness of about ⅜ inches. This is particularly important where support article 10 is employed with a car seat having safety straps 14 as shown in FIG. 1 because it reduces the amount of compression in the event of impact or sudden movement during transportation. It is known that too much compressive padding between the infant and the car seat increases the risk that the infant will become dislodged from the car seat during such an eventuality as a result of slack in the shoulder harness.

Raised support pillow 60 is disposed on an upper region 34 of elongated pad 20 and extends in an arcuate configuration around an area 68 that is sized and adapted to receive the infant's head when infant is placed in the seated position on the carrier device 12. Support pillow 60 is operative to stabilize the infant's head by resisting lateral movement of the head during transport in the carrier device.

Figure 5:
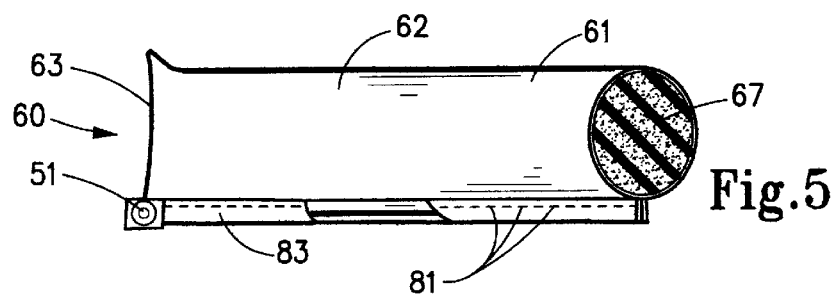
FIG. 5 is a side view in elevation of the support article's raised support pillow as viewed about lines 5—5 in FIG. 2.
Figures 6A, 6B:
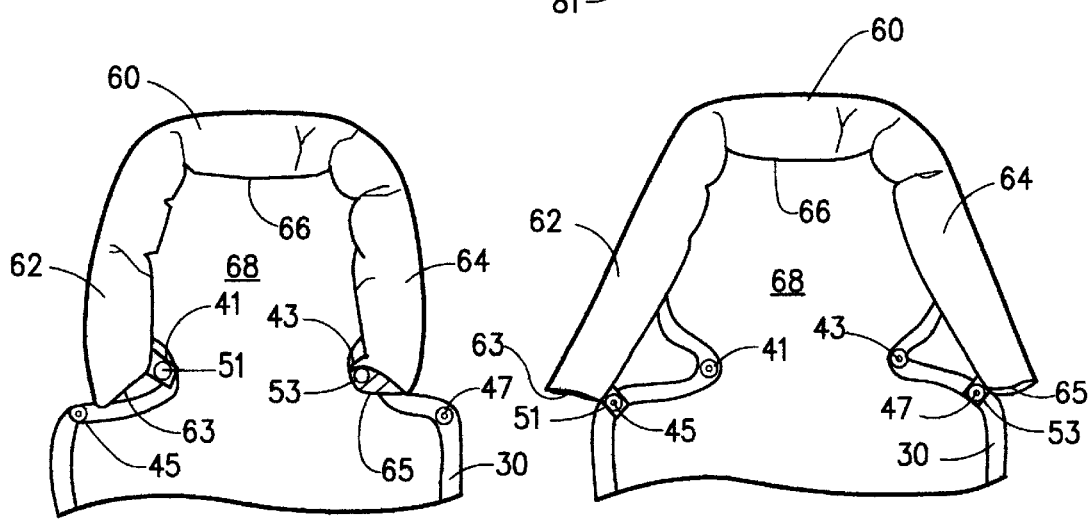
FIG. 6(a) is a top plan view showing the support pillow attached in a first adjustment position on the support article's elongated pad.
FIG. 6(b) is a top plan view showing the support pillow attached in a second adjustment position on the support article's elongated pad.

The preferred construction for support pillow 60 may be understood with reference to FIGS. 5, 6(a) and 6(b). As best shown in FIG. 5, support pillow 60 is formed of a resilient foam material 67 encased by a fabric shell 61. For safety reasons it is preferred that foam material 67 is also flame retardant. Fabric shell 61 is sewn together by stitching 81 along a hem 83, as is known. FIG. 5 also shows that support pillow 60 may be generally elliptical in cross-section and have a substantially uniform height throughout which provides greater cushion support to the head, neck and shoulders of the infant so that lateral movement of the infant's head is resisted when the child is placed on support article 10 in the seated position shown in FIG. 1.

Support pillow 60 is releasably securable to elongated pad 20 in a plurality of discrete adjustment positions. To this end, the elongated pad's peripheral margin 30 includes a plurality of fastening structures of a first type which are adapted to releasably engage cooperative fastening structures of a second type associated with support pillow 60. Accordingly, a pair of inboard female snaps 41,43 and a pair of outboard female snaps 45,47 are provided along peripheral margin 30 and these are adapted to releasably engage cooperative male snaps 51,53 associated with support pillow 60. Support pillow 60 has a mid portion 66 thereof intimately secured to elongated pad 20 along hem 83 and a pair of free end portions 62 and 64 which extend from mid portion 66. A first male snap 51 is positioned on hem 83 proximate to a distal end 63 of free end portion 62 and a second male snap 53 is positioned proximate to a distal end 65 of free end portion 64. With this construction, support pillow 60 may be secured in at least two discrete adjustment positions along peripheral margin 30 so that the size of the area 68 may be varied to accommodate various sizes of infants.

To illustrate, FIG. 6(a) shows a first adjustment position wherein each of the cooperative fastening structures 51,53 is releasably connected to a respective one of the pair of the inboard female snaps 41,43. Thus, first male snap 51 is releasably connected to first inboard female snap 41 and second male snap 53 is releasably connected to second inboard female snap 43 to define a region 68 within which the infant's head may be comfortably and safely received. A second discrete adjustment position is shown in FIG. 6(b) wherein it may be seen that cooperative fastening structures 51 and 53 are now releasably connected to a respective one of the pair of outboard female snaps 45,47 disposed along the peripheral margin 30 of elongated pad 20. Thus, first male snap 51 is releasably connected to first outboard female snap 45 and second male snap 53 is releasably connected to a second outboard female snap 47 to define an area 68' that is larger than area 68 in FIG. 6(a) and, thus, able to accommodate a larger sized infant.

It should be appreciated, then, that support pillow 60 may be selectively and releasably connected to elongated pad 20 to accommodate either various sizes of infants placed thereon or a single infant as he/she grows. Of course, that the adjustability of support pillow 60 should not be unnecessarily limited to the dual-stages discussed herein. Rather, the invention contemplates that the size of region 68 may be increased or decreased in discrete amounts by employing additional releasable connectors. Moreover, while the figures illustrate cooperative fastening structures in the form of male and female snap members, it should be understood by one of ordinary skill in the art that other types of releasable connectors, such as Velcro® or structural equivalence thereof, may instead be employed.

The support article's raised cushion assembly is disposed on the elongated pad's first surface and is operative to provide lateral stability to a torso region 15 of infant 18 when the infant 18 is transported in carrier device 12, as shown in FIG. 1. With reference again to FIGS. 2 and 3, cushion assembly 70 includes a first cushion element 72 and a second cushion element 76 which are respectively positioned adjacent to an associated one of the elongated pad's longitudinally extending side edges 26, 28 so that first and second cushion elements 72, 76 are transversely spaced apart from one another on first surface 22. Each of first and second cushions elements 72, 76 has a proximal edge portion positioned adjacent to the associated one of the longitudinally extending side edges and extends from the proximal edge portion to terminate at a free edge portion. More specifically, and as shown in FIG. 2, first cushion element 72 has its proximal edge portion 71 positioned adjacent to first longitudinally extending side edge 26 while second cushion element 76 has its proximal edge portion 75 positioned adjacent to second longitudinally extending side edge 28. It is preferred that proximal edge portions 71 and 75 are each intimately secured to elongated pad 20, as discussed in more detail hereinbelow with reference to FIG. 9, but it is certainly contemplated that proximal edge portions 71,75 could also be releasably connected to elongated pad 20 through the use of appropriate fastening structures.

Each of cushion elements 72 and 76 is selectively configurable from an unfolded state shown in FIG. 2 to a folded state shown in FIG. 3 wherein their respective free edge portions are releasably connected to first surface 22 to define a channel therebetween, the width of which may be selectively varied to accommodate various sizes of infants. To this end, a free edge portion 73 of first cushion element 72 includes a first strip of fastening material 56 which is adapted to releasably engage a cooperative band of fastening material 54 that is disposed on elongated pad 20 and forms part of first surface 22. Likewise, second cushion element 76 has its free edge portion 77 provided with a second strip of fastening material 58 which is adapted to releasably engage band 54. While various types of fastening devices may be employed to accomplish this, it is preferred that cooperative filiform materials be employed with first and second strips of fastening material 56, 58 constructed of non-abrasive hook material and band 54 constructed of a non-abrasive loop material such as polyester which is quite durable.

Figure 7:
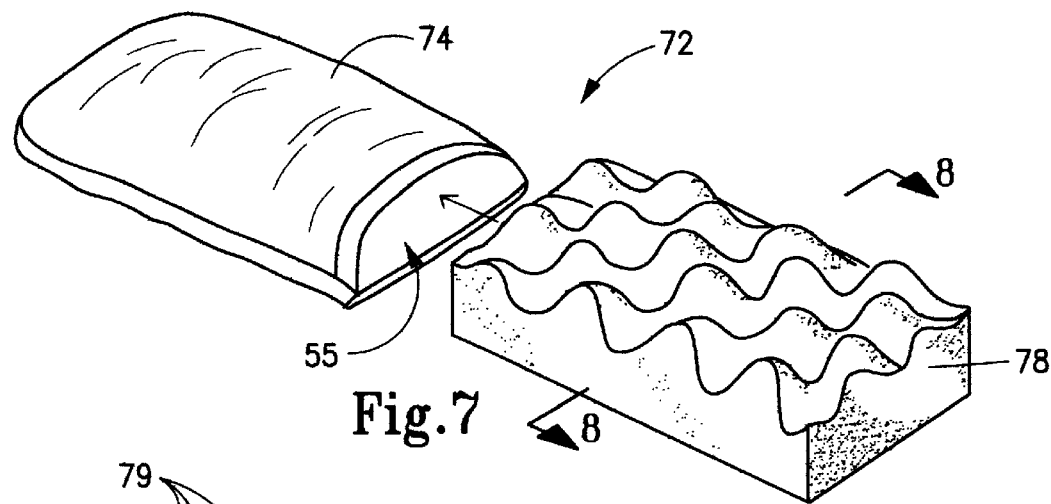
FIG. 7 is an exploded perspective view of a representative one of the cushion elements for the cushion assembly utilized with the support article according to the various embodiments of the present invention.
Figure 8:
FIG. 8 is a side view in cross-section of the padded insert as viewed about lines 8—8 in FIG. 7.
Figure 9:
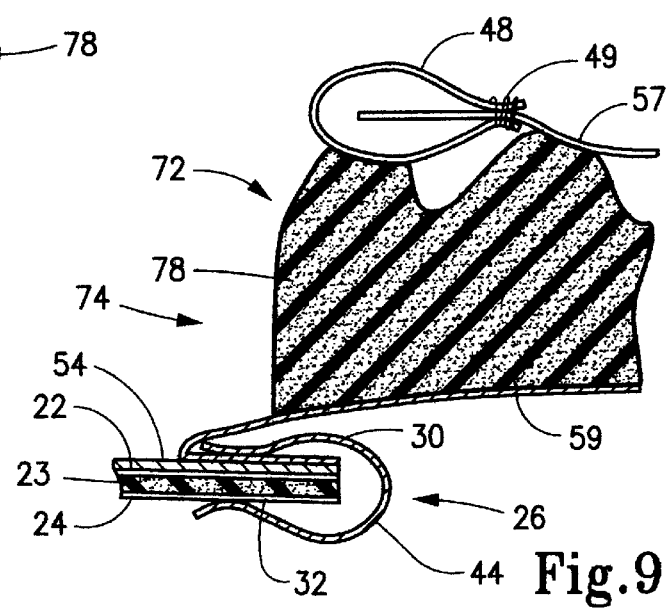
FIG. 9 is an enlarged cross-sectional side view showing the securement for a representative one of cushion elements to the support article's elongated pad.

FIGS. 7–9 illustrate the preferred construction for representative cushion element 72 which comprises a component part of cushion assembly 70. Of course, it should be appreciated that second cushion element 76 would be constructed similarly. In FIG. 7, then, it may be seen that first cushion element 72 is formed as a pocket 74 having an interior 55 within which a foam insert 78 is nestably received. As with the construction of the support article's elongated pad, it is also preferred that pocket 74 be made from polycotton fabric. As shown in FIGS. 7 and 8, foam insert 78 is preferably in the form of a convoluted material, commonly referred to as egg crate foam, to have a plurality of compressible and resilient mounds 79 so that insert 78 may be inserted into pocket 74 and substantially fill the pocket to provide a protective padding for a lateral side of the infant's torso.

The securement of first cushion element 72 to elongated pad 20 may now be better appreciated with reference to FIG. 9 which shows first cushion element 72 hingedly secured to elongated pad 20 along peripheral margin 30. More specifically, a hem 44 extends along first longitudinally extending side edge 26 and, in fact, along the entire periphery of elongated pad 20. Hem 44 encapsulates the peripheral edge margins of each of first surface 22, second surface 24, foam layer 23 therebetween, the band of fastening material 54 which forms part of first surface 22, and the lower fabric layer 59 of pocket 74. Each of these elements is fixedly secured to hem 44 by appropriate stitching 32 extending therethrough. A hem 48 is also employed to securely retain an upper fabric layer 57 of pocket 74 by appropriate stitching 49.

Figure 10:
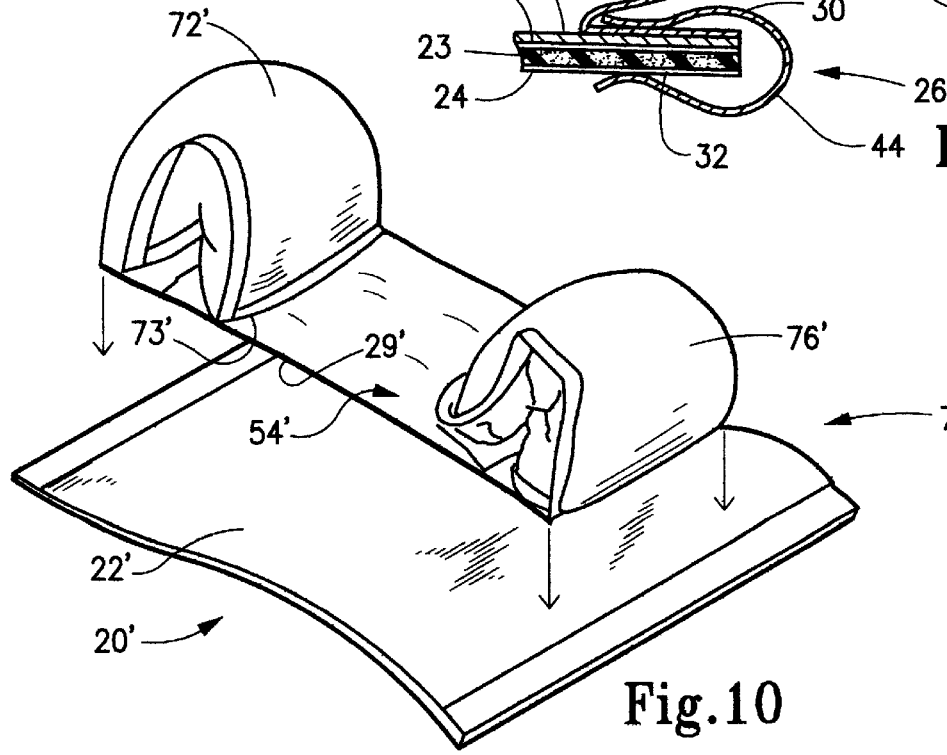
FIG. 10 is an exploded perspective view showing an alternative construction for the cushion assembly which may be utilized with the support article of the present invention.

With the above description in mind concerning a preferred construction for cushion assembly 70 for utilization in the support article 10 according to the first exemplary embodiment of the present invention, one would appreciate that other possible alternative constructions are also contemplated without departing from the inventive concepts contained herein. For example, the entire cushion assembly could be constructed to releasably engage the elongated pad. FIG. 10 shows a cushion assembly 70' which is constructed similarly to cushion assembly 70 discussed above, with the exception that the band of fastening material 54' that spans between first and second cushion elements 72',76' now has its lower surface 29' adapted to releasably engage first surface 22' of elongated pad 20'. This could be accomplished, for example, by fabricating lower surface 29' out of a hook material and fabricating at least a portion of first surface 22' out of a loop material, or vice-versa. Of course, other types of engagement structures are certainly contemplated.

Figures 11A, 11B:
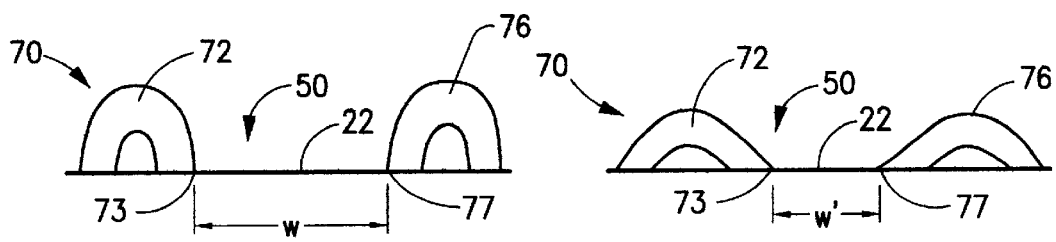
FIG. 11(a) is a diagrammatic side view illustrating one possible engagement position for the support article's cushion assembly.
FIG. 11(b) is a diagrammatic side view illustrating another possible engagement position for the support article's cushion assembly.

The versatility of cushion assembly 70 may be seen in FIGS. 11(a) and 11(b). In FIG. 11(a), one possible engagement position for the first and second cushion elements 72,76 is illustrated. Here, the free edge portion 73 of first cushion element 72 and the free edge portion 77 of second cushion element 76 are releasably connected to first surface 22 to define a channel 50 having a channel width "w" between free edge portions 73 and 77. In FIG. 11(b), another possible engagement position is illustrated wherein the free edge portion 73 of first cushion element 72 and the free edge portion 77 of second cushion element 76 are releasably connected to first surface 22 to define a width "w" for channel 50 which is smaller than the channel width "w" illustrated in FIG. 11(a).

Figure 12:
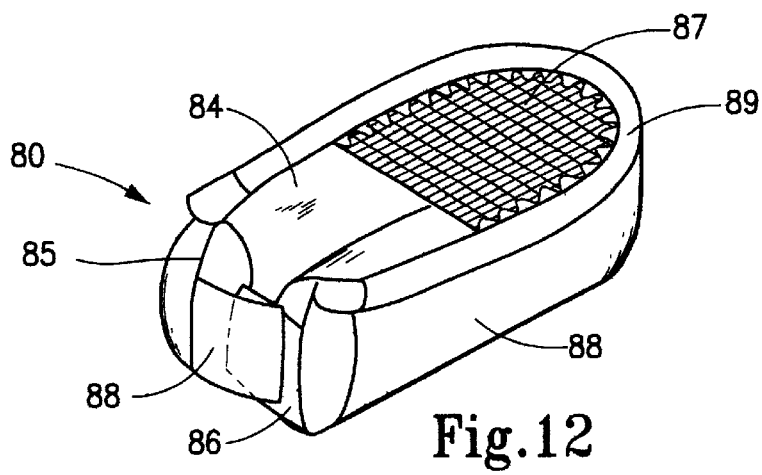
FIG. 12 is a perspective view of the crotch cushion for the support article according to the first exemplary embodiment of the present invention.
Figures 13A, 13B:
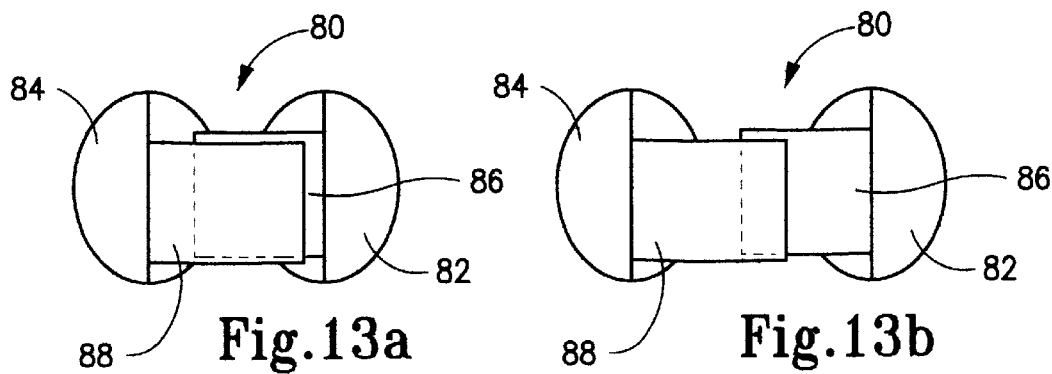
FIG. 13(a) is an end view in elevation diagramatically illustrating a first adjustment position for the support assembly's crotch cushion.
FIG. 13(b) is an end view in elevation diagramatically illustrating a second adjustment position for the support assembly's crotch cushion.

One type of construction for crotch cushion 80 which may be utilized with support article 10 according to the first exemplary embodiment of the present invention may be appreciated with reference to FIGS. 12, 13(a) and 13(b). Crotch cushion 80 is an elongated tubular member which is bent around a mid-section thereof to form a pair of spaced apart first and second legs, 82 and 84 respectively, of equal length. Crotch cushion 80 is maintained in this bent configuration by securing legs 82 and 84 together through the use of a fastening panel 87 which, along with hem 89, is sewn to crotch cushion 80 along seam 85. Fastening panel 87 is preferably a strip of non-abrasive hook material which is adapted to releasably engage a cooperative non-abrasive strip of loop material 39 which is secured to first surface 22 in the lower region 38 of elongated pad 20, as shown in FIGS. 2 and 3. It may be appreciated, then, that when infant 18 is placed on support article 10 as shown in FIG. 1, the infant's legs 19 may straddle crotch cushion 80. Moreover, crotch cushion 80 is adapted to releasably engage strip 39 at a plurality of locations therealong to accommodate different sizes of infants and, when in use, crotch cushion 80 is operative both to maintain the infant in a proper travel position and to buffer the infant against impact with the safety belt 16 of carrier device 12 during transport.

In order to allow for added adjustability, crotch cushion 80 also includes an adjustable fastening structure so that a separation distance between legs 82 and 84 may be selectively varied. To this end, a first fastener strip 86 is attached to first leg 82 and a second cooperative fastener strip 88 is attached to second leg 84 to maintain a desired separation width between the legs. Fastener strips 86 and 88 may take on a variety of forms, but it is preferred that they be cooperative hook and loop fasteners as discussed above. FIG. 13(a), for example, shows fasteners 86 and 88 releasably connected in a first engagement position to illustrate a first separation distance therebetween. Likewise, FIG. 13(b) shows fasteners 86 and 88 releasably connected in a second engagement position to illustrate a second, larger separation distance between legs 82 and 84.

Figure 16:
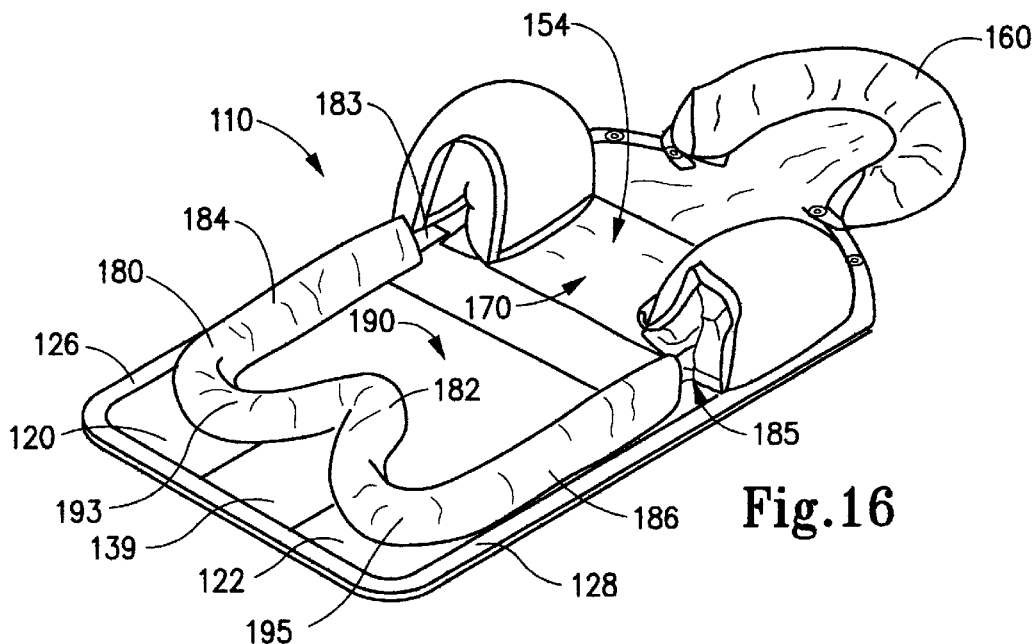
FIG. 16 is a perspective view of the support article according to a second exemplary embodiment of the present invention.
Figures 17, 18:
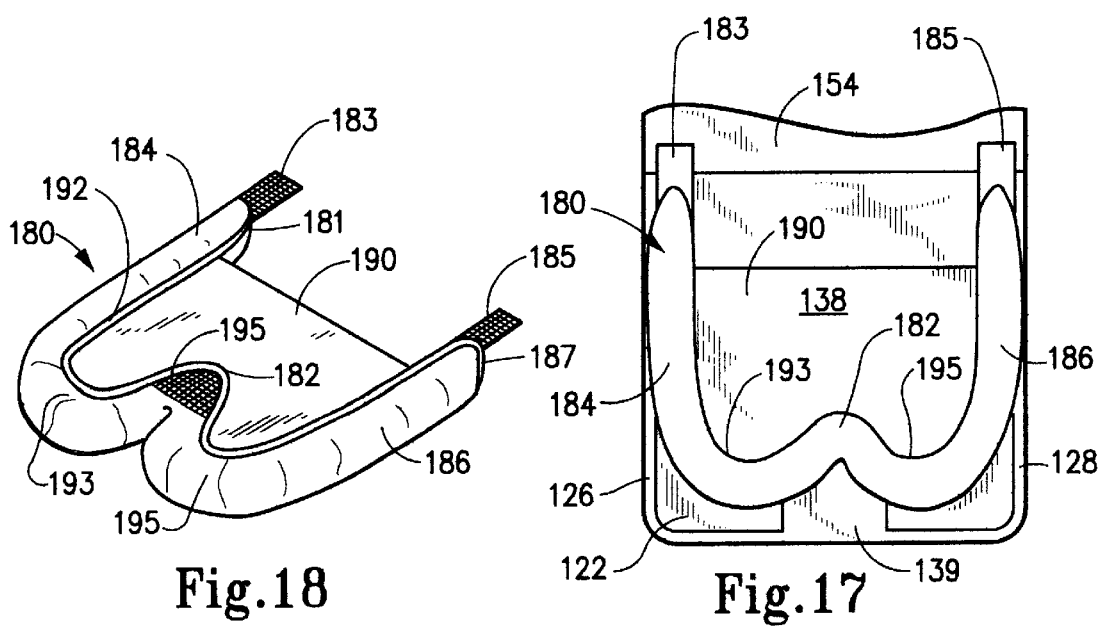
FIG. 17 is a partial top plan view of the support article according to the second exemplary embodiment of the present invention.
FIG. 18 is a perspective view showing the preferred construction for the crotch cushion for use with the support article according to the second exemplary embodiment of the present invention.
Figures 14, 15:
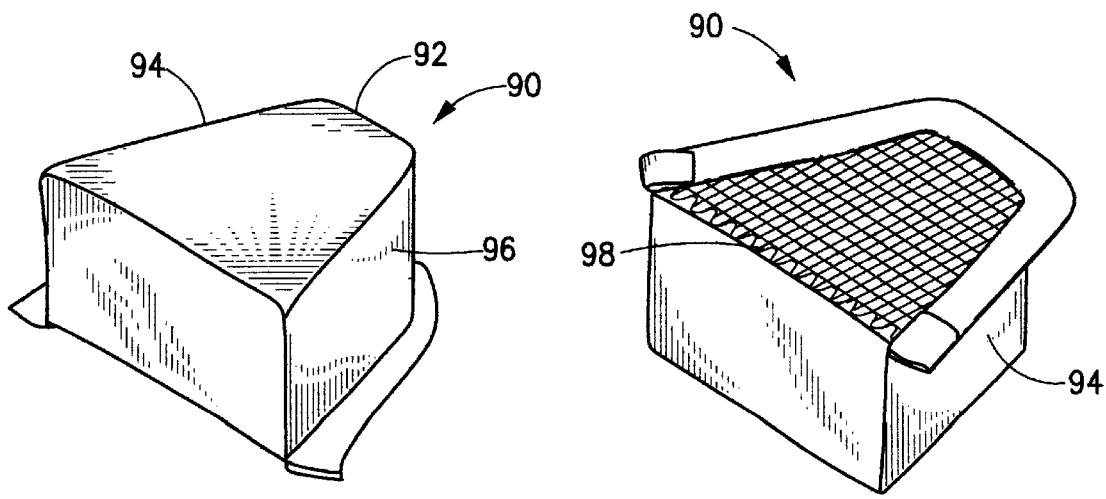
FIG. 14 is a perspective view of an alternative construction for the crotch cushion for use with the support article according to the first exemplary embodiment of the present invention.
FIG. 15 is another perspective view showing the bottom of the crotch cushion depicted in FIG. 14.

FIGS. 14 and 15 illustrate an alternative construction for the crotch cushion which may be employed with the support article 10 according to the first exemplary embodiment of the present invention. Here, alterative crotch cushion 90 is a truncated member generally in the form of a trapezoidal wedge including a strip of fastening material 98 on a lower surface thereof which is adapted to releasably engage the support article's elongated pad. It should be understood, then, that when in use, alternative crotch cushion 90 would be positioned at a selective longitudinal location along the support article's elongated pad so that crotch cushion's sidewall 92 is positioned in close proximity to the infant's crotch to allow for the infant's legs to straddle the crotch cushion's divergent sidewalls 94, 96. A second exemplary embodiment for the support article of the present invention is shown in FIGS. 16–18. Support article 110 is constructed similarly to the support article 10 discussed above so that support article 110 broadly includes an elongated pad 120 to which is attached a raised support pillow 160, a cushion assembly 170 and a crotch cushion 180. The distinguishing feature of support article 110, though, is the construction of crotch cushion 180. Crotch cushion 180 is an elongated pad that is formed generally into a W-configuration so that its has an arcuate mid-section 182 and a pair of first and second arcuate portions 193, 195 that are adjacent to mid-section 182. First and second leg portions 184 and 186 extend, respectively, from arcuate portions 193, 195 to termate at first and second leg ends 181 and 187.

Crotch cushion 180 is releasably connected to the elongated pad's first surface 122 at three spaced apart locations so that a majority of first leg 184 is disposed in the elongated pad's lower region 138 and extends along first longitudinally extending side edge 126 while a majority of second leg 186 is disposed in lower region 138 and extends along second longitudinally extending side edge 128, as shown in FIG. 17. First leg 184 includes a first fastening tab 183 projecting therefrom and second leg 186 includes a second fastening tab 185 projecting therefrom. Each of fastening tabs 183, 185 is formed as a strip of fastening material which is adapted to releasably connect to the cooperative band of fastening material 154 which forms part of first surface 122 in medial region 136. Mid-section 182 is also provided with a fastening material 195 which is adapted to releasably connect to the cooperative strip of fastening material 139 at selected locations thereon.

Crotch cushion 180 additionally includes a cloth panel 190 which is secured thereto and spans between first and second legs 182 and 184. More specifically, cloth panel 190 is seamed to crotch cushion 180 along hem 192 so that it follows the inner contour of crotch cushion 180. First and second fastening tabs 183, 185 are likewise secured to crotch cushion 180 by stitching along hem 192, as would be understood by one of ordinary skill in this field.

It is known that infants are sometimes feisty and like to stretch their legs or push their feet against things when in a seated or reclined position. With the above construction in mind then it should be appreciated that support article 110 provides such a structure in that an infant situated thereon is permitted to exert pressure against crotch cushion 180 with its legs. To this end, crotch cushion 180 is configured generally as a "W" to provide the arcuate portions 193, 195 adjacent to mid-section 182 where the infant can push. Cloth panel 190 is specifically secured to crotch cushion 180 along hem 192 so that there are no gaps therebetween, thereby to prevent the infant's feet from extending beneath crotch cushion 180 during use.

Crotch cushion 180, of course, also provides the same advantages as crotch cushion 80 discussed above with reference to the first exemplary embodiment for the support article of the present invention. That is, crotch cushion 180 operates to buffer the infant against impact with the safety buckle during transport in a carrier device and it helps to retain the infant in a proper position on support article 110 during use. Crotch cushion 180 also provides additional cushion support for the infant's legs during use.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A support article adapted for use with a carrier device to provide adjustable cushioned support to an infant that is placed therein in a travel position, comprising:

(a) an elongated pad adapted to be interposed between the infant and the carrier device, said elongated pad having a first surface upon which the infant can be placed in the travel position and a second surface opposite said first surface and including a pair of longitudinally extending side edges; and (b) a raised cushion assembly disposed on said first surface and including a pair of transversely spaced apart cushion elements that are adjustable in position relative to one another, a first one of said cushion elements having a proximal edge portion positioned adjacent to an associated one of said longitudinally extending side edges and configurable into a folded state wherein a free edge portion of said first cushion element is releasably connected to said first surface thereby to define a channel between said cushion elements which is sized to accommodate a torso region of the infant so that said cushion assembly is operative to provide lateral stability to the torso region during transport in the carrier device.

2. A support article according to claim 1 wherein said proximal edge portion is affixed to said elongated pad along the associated one of said longitudinally extending side edges.

3. A support article according to claim 2 wherein said proximal edge portion is affixed to said elongated pad by stitching along a peripheral margin of said elongated pad.

4. A support article according to claim 1 including a pair of cooperative fasteners located, respectively, on said free edge portion and said elongated pad for releasably connecting said free edge portion to said first surface when said first cushion element is configured into the folded state.

5. A support article according to claim 4 wherein a first one of said cooperative fasteners is affixed to said free edge portion and formed as a strip of hook material and wherein a second one of said cooperative fasteners is affixed to said first surface and formed as a strip of loop material.

6. A support article according to claim 1 wherein a second one of said cushion elements has a proximal edge portion positioned adjacent to another of said longitudinally extending side edges and is configurable into a folded state wherein a free edge portion of said second cushion element is releasably connected to said first surface.

7. A support article according to claim 6 wherein each said proximal edge portion is affixed to said elongated pad.

8. A support article according to claim 7 including first and second pairs of cooperative fasteners for releasably connecting said first and second free edge portions, respectively, to said first surface, a first one of said cooperative fasteners in each of said first and second pairs affixed to the free edge portion of an associated one of said first and second cushion elements, and a second one of said cooperative fasteners in each of said first and second pairs affixed to said first surface.

9. A support article according to claim 8 wherein the first cooperative fasteners in each of said first and second pairs is formed of a strip of hook material, and wherein said elongated pad includes a single band of loop material affixed thereto and extending between said longitudinally extending side edges to define the second one of said cooperative fasteners in each of said first and second pairs.

10. A support article according to claim 1 wherein said cushion assembly is intimately secured to said elongated pad.

11. A support article according to claim 1 including a raised support pillow connected to said elongated pad and extending in an arcuate configuration around an area that is sized and adapted to receive the infant's head when the infant is placed in the travel position on the carrier device, said raised support pillow operative to stabilize the infant's head by resisting lateral movement of the head during transport in the carrier device.

12. A support article according to claim 11 wherein said raised support pillow is adjustably connected to said elongated pad whereby said area is selectively changeable.

13. A support article adapted for use with a car seat to provide a cushioned support for an infant seated thereon, wherein the car seat includes a backrest provided with a pair of shoulder straps that are operative to extend over the infant to releasably engage a safety buckle, said support article comprising:

(a) an elongated pad having a first surface upon which the infant can be placed in a seated position and an opposite second surface adapted to be placed against the car seat;

(b) a raised support pillow disposed on an upper region of said first surface and including a central portion extending in an arcuate configuration around an area that is sized and adapted to receive the infant's head when the infant is in the seated position;

(c) a cushion assembly disposed on a medial region of said first surface and operative to provide lateral stability to a torso of the infant, said cushion assembly including a first cushion element and a second cushion element that are spaced apart from one another a separation distance to define a channel within which the infant's torso may be positioned; and (d) a crotch cushion disposed on a lower region of said first surface and centrally located in said lower region so that when the infant is placed in the seated position on said elongated pad the infant's legs can straddle a portion of said crotch cushion, said crotch cushion in the form of an elongated pad that is bent around a mid-section thereof to form a pair of spaced apart legs, said crotch cushion operative to maintain the infant in a proper travel position and to buffer the infant against impact with the safety buckle during transport in the car seat.

14. A support article according to claim 13 wherein said crotch cushion is adapted to releasably engage said first surface.

15. A support article according to claim 14 wherein said crotch cushion is selectively connectable to said first surface at a plurality of locations longitudinally therealong.

16. A support article according to claim 14 including a pair of cooperative fasteners located, respectively, on said crotch cushion and the lower region of said first surface for releasably connecting said crotch cushion to said first surface.

17. A support article according to claim 16 wherein a first one of said cooperative fasteners is affixed to said crotch cushion and formed as a strip of hook material and wherein a second one of said cooperative fasteners is affixed to said first surface and formed as a strip of loop material.

18. A support article according to claim 13 wherein said legs are interconnected by an adjustable fastening structure so that a separation distance therebetween may be selectively varied.

19. A support article according to claim 13 including a pair of cooperative fasteners adapted to releasably connect said crotch cushion to said first surface, a first one of said pair of cooperative fasteners affixed to said crotch cushion and a second one of said pair of cooperative fasteners affixed to said first surface.

20. A support article according to claim 13 wherein said cushion elements are selectively adjustable in position relative to one another.

21. A support article according to claim 20 wherein said raised support pillow is adjustably connectable to said elongated pad whereby said area is selectively changeable.

* * * * *